US012608733B2

(12) United States Patent
Raghavan et al.

(10) Patent No.: US 12,608,733 B2
(45) Date of Patent: Apr. 21, 2026

(54) METHOD, ARTICLE OF MANUFACTURE, AND SYSTEM FOR PROVIDING CATEGORY SUGGESTIONS

(71) Applicant: Shopify Inc., Ottawa (CA)

(72) Inventors: Kshetrajna Raghavan, Fremont, CA (US); Kyle Bruce Tate, Ottawa (CA); Xinyi Zhao, Etobicoke (CA)

(73) Assignee: SHOPIFY INC., Ottawa (CA)

( * ) Notice: Subject to any disclaimer, the term of this patent is extended or adjusted under 35 U.S.C. 154(b) by 258 days.

(21) Appl. No.: 17/880,045

(22) Filed: Aug. 3, 2022

(65) Prior Publication Data

US 2023/0162253 A1      May 25, 2023

Related U.S. Application Data

(60) Provisional application No. 63/283,264, filed on Nov. 25, 2021.

(51) Int. Cl.
G06Q 30/00 (2023.01)
G06N 3/084 (2023.01)
G06Q 30/0601 (2023.01)
*G06N 5/01* (2023.01)

(52) U.S. Cl.
CPC ......... G06Q 30/0625 (2013.01); G06N 3/084 (2013.01); *G06N 5/01* (2023.01)

(58) Field of Classification Search
CPC ..... G06Q 30/0601–0645; G06Q 30/08; G06N 3/084; G06N 5/01
See application file for complete search history.

(56) References Cited

U.S. PATENT DOCUMENTS

| | | | |
|---|---|---|---|
| 5,129,015 A | 7/1992 | Allen et al. | |
| 6,978,271 B1 * | 12/2005 | Hoffman | G06F 16/13 |
| | | | 707/999.102 |
| 6,981,040 B1 * | 12/2005 | Konig | H04L 67/55 |

(Continued)

OTHER PUBLICATIONS

Hafez, M. M. et al. "Classification of Retail Products: From Probabilistic Ranking to Neural Networks" Appl. Sci. 2021, 11, 4117. https://doi.org/10.3390/app11094117 (Year: 2021).*

(Continued)

*Primary Examiner* — Jeffrey A. Smith
*Assistant Examiner* — Lindsey B Smith

(57) ABSTRACT

A method for categorizing a product, the method including receiving information for the product; inputting the information into a trained machine learning model for a taxonomy tree; receiving a plurality of arrays, each array representing a level in the taxonomy tree and consisting of probabilities for each category represented in the level that the product is categorized in that category; choosing, from a highest level tier array, a category having a highest probability, thereby designating a tier prediction; collecting, from a second level tier array, all children of the tier prediction; determining whether a highest probability from the children of the tier prediction exceeds a threshold, and if yes, choosing the category with the highest probably as a new tier prediction; and repeating the determining; when the threshold is not exceeded or if the tier prediction has no children, and selecting the tier prediction as a predicted category.

20 Claims, 10 Drawing Sheets

(56) References Cited

U.S. PATENT DOCUMENTS

| | | | |
|---|---|---|---|
| 7,788,265 B2 * | 8/2010 | Morscher | G06F 16/353 |
| | | | 707/956 |
| 8,095,539 B2 * | 1/2012 | Morscher | G06F 16/353 |
| | | | 707/737 |
| 11,681,541 B2 | 6/2023 | Mostafa | |
| 12,307,382 B1 * | 5/2025 | Manzoor | G06N 3/08 |
| 12,360,791 B1 | 7/2025 | Vadaparty et al. | |
| 2017/0098153 A1 | 4/2017 | Mao et al. | |
| 2019/0287018 A1 * | 9/2019 | Coupe | G06N 20/20 |
| 2021/0142177 A1 * | 5/2021 | Mallya | G06N 3/084 |
| 2022/0067304 A1 | 3/2022 | Luong et al. | |
| 2023/0153522 A1 | 5/2023 | Cho et al. | |
| 2023/0206661 A1 | 6/2023 | Choi et al. | |
| 2023/0325154 A1 | 10/2023 | Arcadinho et al. | |
| 2024/0290118 A1 | 8/2024 | Bellaccini et al. | |
| 2024/0362421 A1 | 10/2024 | Markov et al. | |
| 2024/0428787 A1 | 12/2024 | Namazifar et al. | |
| 2025/0111198 A1 | 4/2025 | Tu et al. | |
| 2025/0165228 A1 | 5/2025 | Libbey | |
| 2025/0173550 A1 | 5/2025 | Scherle | |
| 2025/0259001 A1 | 8/2025 | Platanios et al. | |
| 2025/0284683 A1 | 9/2025 | Modelo-Howard et al. | |
| 2025/0292021 A1 | 9/2025 | Raghavan | |
| 2025/0292022 A1 | 9/2025 | Raghavan | |

OTHER PUBLICATIONS

Vivek Gupta et al. "Product Classification in E-Commerce using Distributional Semantics" Proceedings of COLING 2016, the 26th International Conference on Computational Linguistics: Technical Papers, pp. 536-546, Osaka, Japan, Dec. 11-17, 2016. (Year: 2016).*

Canadian Intellectual Property Office (CIPO) Official Action and Examination Search Report for Application No. 3,170,645 dated Jun. 28, 2024, 7 pages.

Cohen et al., "Decision-Tree Instance-Space Decomposition with Grouped Gain-Ratio", Information Sciences vol. 177 issue 17 pp. 3592-3612, Sep. 1, 2007, 36 pages.

Raghavan, Kshetrajna, "Introducing LinNet: Using Rich Image and Text Data to Categorize Products at Scale", published at https://shopify.engineering/introducing-linnet-using-rich-image-text-data-categorize-products on Sep. 8, 2021.

Canadian Intellectual Property Office (CIPO) Official Action and Examination Search Report for Application No. 3,170,645 dated Sep. 29, 2023, 7 pages.

Jeet Mehta and Kathy Ge, "Categorizing Products at Scale" published at https://shopify.engineering/categorizing-products-at-scale on Apr. 30, 2020.

"Compilers: Principles, Techniques, and Tools". Wikipedia. Exact publication date not known, but published at least as early as Jul. 20, 2023, and accessed online on Oct. 25, 2023. 2 pages. Available online from https://en.wikipedia.org/wiki/Compilers:_Principles,_Techniques,_and_Tools.

Brandonwillard et al. "Use FSMs for scanning during grammar-guide generation #178". GitHub. Accessed online on Oct. 25, 2023, and at least some of the content published as early as Jul. 9, 2023. 5 pages. Available online from https://github.com/outlines-dev/outlines/pull/178.

"Show HN: LLMs can generate valid JSON 100% of the time". Hacker News. Accessed online on Oct. 25, 2023, and at least some of the content published as early as Aug. 14, 2023. 30 pages. Available online from https://news.ycombinator.com/item?id=37125118.

"Extended Backus-Naur form". Wikipedia. Exact publication date not known, but accessed online (and therefore published at least as early as) Oct. 25, 2023. 7 pages. Available online from https://en.wikipedia.org/wiki/Extended_Backus-Naur_form.

"Trie". Wikipedia. Exact publication date not known, but accessed online (and therefore published at least as early as) Oct. 25, 2023. 10 pages. Available online from https://en.wikipedia.org/wiki/Trie.

Ejones et al. "llama: add grammer-based sampling #1773". GitHub. Accessed online on Oct. 25, 2023, and at least some of the content published as early as Jun. 9, 2023. 11 pages. Available online from https://github.com/ggerganov/llama.cpp/pull/1773.

Willard, Brandon T. and Louf, Rémi. "Efficient Guided Generation for Large Language Models". Normal Computing. Jul. 14, 2023. 18 pages.

"Grammar Builder". Exact publication date not known, but accessed online (and therefore published at least as early as) Mar. 25, 2024. 2 pages. Available online from https://grammar.intrinsiclabs.ai/.

Duffy, Andrew, et al."Grammar generator app #2494". GitHub. Accessed online on Mar. 25, 2024, and at least some of the content published as early as Aug. 2, 2023. 11 pages. Available online from https://github.com/ggerganov/llama.cpp/discussions/2494.

Geng et al. "Grammar-constrained decoding for structured NLP tasks without finetuning." arXiv preprint arXiv:2305.13971 Published Jan. 18, 2024. 21 pages.

The Science of Machine Learning, "Masking", Published in 2020. Retrieved from https://www.ml-science.com/masking, 2 pages.

Lau et al. "Grammaticality, Acceptability, and Probability: A Probabilistic View of Linguistic Knowledge". Cognitive Science. Published in 2016. pp. 1-40.

Kommrusch, Steve. "Machine Learning for Computer Aided Programming: From Stochastic Program Repair to Verifiable Program Equivalence". Doctor thesis from Department of Computer Science, Colorado State University. Published in 2022. 270 pages.

Fei et al. "Transferable decoding with visual entities for zero-shot image captioning." Proceedings of the IEEE/CVF international conference on computer vision. Published in 2023. 11 pages.

Anderson et al. "Guided open vocabulary image captioning with constrained beam search." Proceedings of the 2017 Conference on Empirical Methods in Natural Language Processing. Published in 2017. 10 pages.

Mathews et al. "Semstyle: Learning to generate stylised image captions using unaligned text." Proceedings of the IEEE conference on computer vision and pattern recognition. Published in 2018. 10 pages.

* cited by examiner

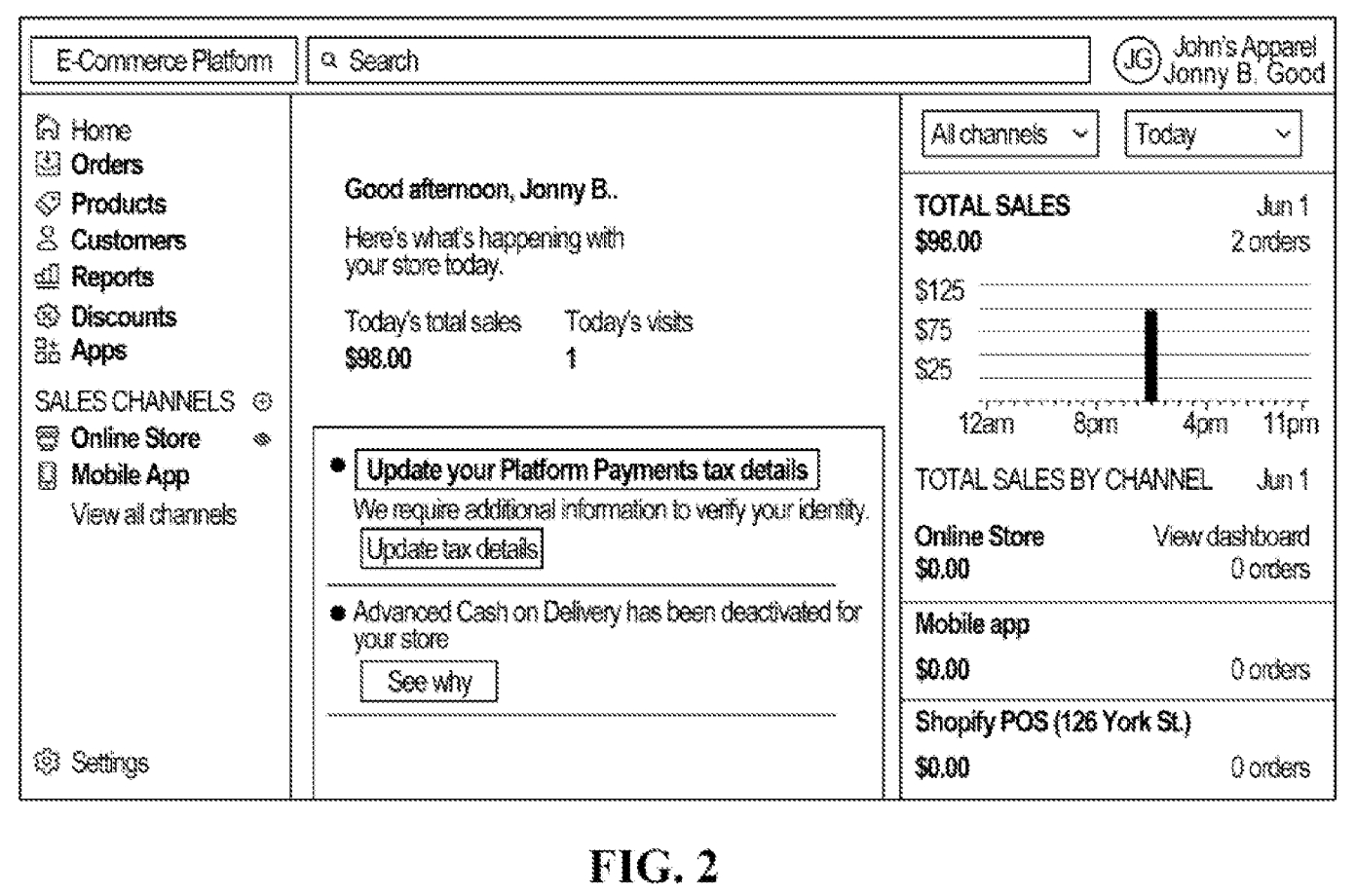

E-Commerce Platform     Q Search     (JG) John's Apparel / Jonny B. Good

Home
Orders
Products
Customers
Reports
Discounts
Apps

SALES CHANNELS
Online Store
Mobile App
View all channels

Settings

Good afternoon, Jonny B.

Here's what's happening with your store today.

Today's total sales     Today's visits
$98.00                   1

• Update your Platform Payments tax details
We require additional information to verify your identity.

Update tax details

• Advanced Cash on Delivery has been deactivated for your store

See why

All channels ˅     Today ˅

TOTAL SALES
$98.00

$125
$75
$25
        12am   8am   4pm   11pm

Jun 1
2 orders

TOTAL SALES BY CHANNEL    Jun 1    View dashboard

Online Store
$0.00                                      0 orders

Mobile app
$0.00                                      0 orders

Shopify POS (126 York St.)
$0.00                                      0 orders

FIG. 2

METHOD, ARTICLE OF MANUFACTURE, AND SYSTEM FOR PROVIDING CATEGORY SUGGESTIONS

FIELD OF THE DISCLOSURE

The present disclosure relates to electronic transactions, and in particular relates to product categorization related to electronic commerce transactions.

BACKGROUND

Product categories are used in e-commerce platforms and sites to group similar products or services together to provide for an enhanced customer experience. In particular, categories may be used as a filter or facet on a search and allow potential purchasers to find a product quickly and also to present other similar products to the potential purchaser.

Further, product categories may be used for defining the type of attributes needed from a potential purchaser for the type of products. For example, a "dress" may define attributes such as a hem length, waist size, among other such attributes, whereas a "basketball shoe" may require foot size and width.

Product categories may be used in analytics to understand buyer preferences. This may be within or across merchants in an e-commerce platform. Further, product categorization may define workflows for the products. For example, all products in a "boots" category may require larger fulfilment boxes. Other uses for product categories are possible.

Product categorizations are often organized hierarchically, meaning that each lower-level category belongs to a broader higher-level category, and parent nodes can also belong to even higher-level categories, such that a tree-like structure is formed. The hierarchy can be as deep and as broad as desired, either by the platform by defining standard product categories across all merchants on the e-commerce platform, or by the merchant creating custom product categories which extend a standard set of product categories.

Accurate product characterization is therefore an important feature for any merchant and also for any e-commerce platform.

SUMMARY

Manual product categorization is both time-consuming and error-prone. For example, a merchant adding a new product may select "basketball shoes" for the product category. However, the next time they add new basketball shoes, the merchant may then have forgotten that they have a "basketball shoes" category and select a broader (higher level) "sports shoes" category instead. This inconsistency is difficult to catch and manage at scale without automated assistance. However, any automated suggestions must be reliable and accurate in order to achieve efficiency and preserve trust.

The present disclosure relates to providing category suggestions. In some cases, a server, cloud service or other computing device may provide such suggestions during product or service input by a merchant. For example, in some cases embodiments described herein provide for suggestions to be presented to a merchant entering a new product into their electronic store, which are refined as the merchant enters more product details to ensure that accurate and reliable product category information is associated with the product.

The server, cloud service or other computing device providing the product suggestions may utilize a message containing information for the product. The information may then be used in a trained machine learning model to create arrays of probabilities that the product or service belongs to a node in the hierarchical taxonomy tree. Each array in this case may represent a level of the hierarchical tree. The choice of the node may involve finding the highest probability node at a root level, and then filtering the array for the next level to only include children of the selected node. The highest probability may continue to be recursively selected until the selected node has no children or a probability that the product belongs to any child node falls below a threshold level. The selected node can then be returned to the merchant computing device as a suggested category. In other cases, rather than recursive selection, other computing techniques including function calls could similarly be used.

In one aspect, a method at a computing device for categorizing a product may be provided. The method may include receiving a message at the computing device, the message containing information for the product. The method may further include inputting the information for the product into a trained machine learning model for a taxonomy tree, nodes of the taxonomy tree corresponding to categories in the taxonomy, wherein subcategories of a given node of the taxonomy tree form a subtree of the given node. The method may further include receiving a plurality of arrays from the machine learning model, each array of the plurality of arrays representing a level of the taxonomy tree, each array consisting of values corresponding to nodes at that level of the taxonomy tree and representing likelihoods that the product should be categorized in respective ones of the categories corresponding to the nodes at that level of the taxonomy tree. The method may further include traversing the taxonomy tree based on the plurality of arrays to determine a predicted category, the traversal including: choosing, from an array representing a highest level tier, a category having a highest likelihood, thereby designating a tier prediction; traversing the tree wherein for a given tier prediction it is determined whether a highest likelihood from the children of that tier prediction as collected from arrays representing that level exceeds a threshold and, if so, the category corresponding to that highest likelihood becomes the tier prediction and otherwise the given tier prediction is selected as the predicted category. The method may further include returning, from the computing device, the predicted category.

In some embodiments, the message may contain information from a storefront as the information is entered.

In some embodiments, the method may further comprise receiving a second message containing further information, wherein the method comprises repeating the inputting, collecting, determining, and returning upon receipt of the second message.

In some embodiments, the method may further comprise, upon determining a tier prediction, inputting the tier prediction and information into the machine learning model to obtain updated arrays.

In some embodiments, the threshold may vary between each category in each level.

In some embodiments, the method may further comprise, prior to receiving the message, training the machine learning model for the taxonomy tree, the training comprising: treating each level of the taxonomy tree as a separate classification problem; and providing feedback to a lower level based on classification in a higher level.

In some embodiments, the training may further comprise: separating text and multimedia from the message; feeding each of the text and multimedia into separate hidden layers in the machine learning model; and combining the results from the separate hidden layers to provide an output from the level.

In some embodiments, the training may further comprise: using backpropagation to influence a weight given to a higher level.

In some embodiments, the training may further comprise: adding class weights during training to mitigate class imbalances in a training dataset.

In a further aspect, a computing device for categorizing a product may be provided. The computing device may include: a processor; and a communications subsystem. In some embodiments, the computing device may be configured to receive a message, the message containing information for the product. The computing device may further be configured to input the information for the product into a trained machine learning model for a taxonomy tree, nodes of the taxonomy tree corresponding to categories in the taxonomy, wherein subcategories of a given node of the taxonomy tree form a subtree of the given node. The computing device may further be configured to receive a plurality of arrays from the machine learning model, each array of the plurality of arrays representing a level of the taxonomy tree, each array consisting of values corresponding to nodes at that level of the taxonomy tree and representing likelihoods that the product should be categorized in respective ones of the categories corresponding to the nodes at that level of the taxonomy tree. The computing device may further be configured to traverse the taxonomy tree based on the plurality of arrays to determine a predicted category, the traversal including: choosing, from an array representing a highest level tier, a category having a highest likelihood, thereby designating a tier prediction; traversing the tree wherein for a given tier prediction it is determined whether a highest likelihood from the children of that tier prediction as collected from arrays representing that level exceeds a threshold and, if so, the category corresponding to that highest likelihood becomes the tier prediction and otherwise the given tier prediction is selected as the predicted category. The computing device may further be configured to return, from the computing device, the predicted category.

In some embodiments, the message may contain information from a storefront as the information is entered.

In some embodiments, the computing device may be further configured to receive a second message containing further information, wherein the computing device is further configured to repeat the inputting, collecting, determining, and returning upon receipt of the second message.

In some embodiments, the computing device may further be configured to, upon determining a tier prediction, input the tier prediction and information into the machine learning model to obtain updated arrays.

In some embodiments, the threshold may vary between each category in each level.

In some embodiments, the computing device may be further configured to, prior to receiving the message, train the machine learning model for the taxonomy tree, the training comprising: treating each level of the taxonomy tree as a separate classification problem; and providing feedback to a lower level based on classification in a higher level.

In some embodiments, the training may further comprise: separating text and multimedia from the message; feeding each of the text and multimedia into separate hidden layers in the machine learning model; and combining the results from the separate hidden layers to provide an output from the level.

In some embodiments, the training may further comprise: using backpropagation to influence a weight given to a higher level.

In some embodiments, the training may further comprise: adding class weights during training to mitigate class imbalances in a training dataset.

In a further aspect, a non-transitory computer readable medium for storing instruction code may be provided. The instruction code, when executed by a processor of a computing device configured for categorizing a product may cause the computing device to receive a message, the message containing information for the product. The instruction code may further cause the computing device to input the information for the product into a trained machine learning model for a taxonomy tree, nodes of the taxonomy tree corresponding to categories in the taxonomy, wherein subcategories of a given node of the taxonomy tree form a subtree of the given node. The instruction code may further cause the computing device receive a plurality of arrays from the machine learning model, each array of the plurality of arrays representing a level of the taxonomy tree, each array consisting of values corresponding to nodes at that level of the taxonomy tree and representing likelihoods that the product should be categorized in respective ones of the categories corresponding to the nodes at that level of the taxonomy tree. The instruction code may further cause the computing device to traverse the taxonomy tree based on the plurality of arrays to determine a predicted category, the traversal including: choosing, from an array representing a highest level tier, a category having a highest likelihood, thereby designating a tier prediction; traversing the tree wherein for a given tier prediction it is determined whether a highest likelihood from the children of that tier prediction as collected from arrays representing that level exceeds a threshold and, if so, the category corresponding to that highest likelihood becomes the tier prediction and otherwise the given tier prediction is selected as the predicted category. The instruction code may further cause the computing device to return, from the computing device, the predicted category.

In one embodiment, the message may contain information from a storefront as the information is entered.

BRIEF DESCRIPTION OF THE DRAWINGS

The present disclosure will be better understood with reference to the drawings, in which:

FIG. 2 is a block diagram showing an example interface for a merchant using the e-commerce platform of FIG. 1.

DETAILED DESCRIPTION

Figure 1:
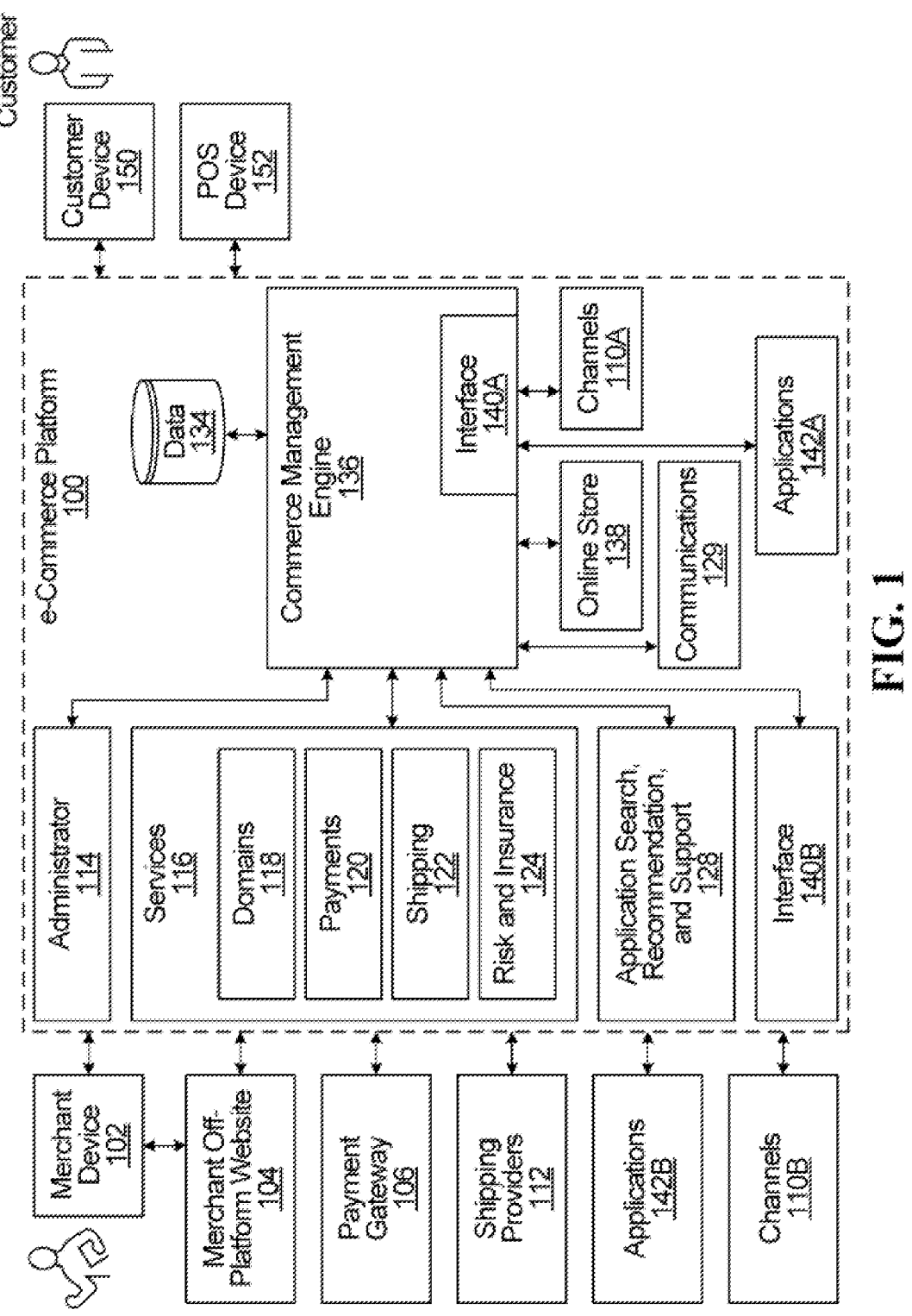
FIG. 1 is a block diagram showing an example e-commerce system capable of implementing the embodiments of the present disclosure.

The present disclosure will now be described in detail by describing various illustrative, non-limiting embodiments thereof with reference to the accompanying drawings. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with the embodiments of the present disclosure, methods and systems providing product suggestions to a merchant for a product or service that is being added to the merchant's electronic storefront are provided. The product suggestion comes from a standard taxonomy that is used to classify goods and services within an e-commerce platform.

The taxonomy is typically organized in a hierarchy and can be represented by a tree structure, where all child node categories belong to their respective parent node. In this regard, the taxonomy has a plurality of levels, where each level of the taxonomy includes a plurality of nodes. In each level, various child nodes may belong to different parent nodes.

Thus, a product characterization system is provided which offers product category suggestions, potentially while a merchant is entering new product information into the e-commerce site or platform. The suggestions offer a product category at an appropriate hierarchy level, and may in some cases be based on the confidence of the category prediction.

In practice, at a web server, client device, or platform that a merchant is interacting with, the merchant may enter information about a new product or service that the merchant will be offering for sale. Entering of such product or service information may include text inputs such as a title, description, tags, or other similar information. Entering of such product or service information may further include uploading media files such as pictures, video, virtual-reality models, among other such data.

As the user or merchant enters information into the web server, client device or platform, or afterwards in some cases, the information may be sent to the prediction platform and the prediction platform may then analyze each new piece of information submitted, typically combining this new information with the previous information submitted, to re-evaluate or refine suggestions. Specifically, the web server, client device or platform may interact with a prediction platform through various interface or query types in order to provide information to the prediction platform.

In some cases, the input by the merchant may be batched or grouped prior to being sent to the prediction platform. For example, a threshold number of characters may be required prior to sending the information to the prediction platform. Thus, the information may be provided when a certain threshold level of text has been entered, when new images or media have been provided, or at other points during the merchant's interaction with the web server, client device or platform. However, in some cases the information may be updated in real time without threshold limits. In some cases the information may be completely entered prior to sending the information to the prediction platform.

The prediction platform may receive the query and may then use one or more machine learning modules or other predictive modules to determine a probable product category for the new item being entered.

In particular, product categories are stored in a hierarchical manner, where, for example, "shoes" may belong to "apparel and accessories", and "sneakers" may belong to "shoes", etc. In some cases, the prediction platform may have a separate machine learning model for each tier or level in the hierarchy. For example, the machine learning models may be binary classifiers, such that each model simply outputs a yes/no that a given sample belongs to the one product category the model is trained to recognize.

Alternatively, the machine learning models could be multiclass classifiers which recognize more than one product category and output which one of the multiple categories the given sample is most likely to belong to, along with a certainty value.

Based on such model or models, a suggested category node can be found, along with a confidence score in some cases. As more information is provided to the prediction platform, the suggested category node and/or the confidence score may change.

Further, utilizing such machine learning or predictive modules can, in some cases, overcome ambiguities in the input that is being provided by a merchant. For example, media such as a picture may include the new product along with other information. For example, a model may be shown, and it is ambiguous from the picture whether the new product is the shirt the model is wearing, the pants the model is wearing or the shoes that the model is wearing, among other products shown in the photograph. In other cases, the description may be ambiguous. For example, if the merchant on the product description states "Make your shoes pop with our designer sock collection", the machine learning algorithm will need to recognize that the merchant is selling socks. In this case, a combination of media and other text may assist the prediction platform.

In some cases, a previously suggested category may be refined to a lower-level category or potentially different category altogether with the newly available information.

The probable product category, along with a confidence score in some cases, may then be returned to the web server, client device or platform.

Each aspect is described in more detail below.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM)

and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform

100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Product Categorization

Figure 3:
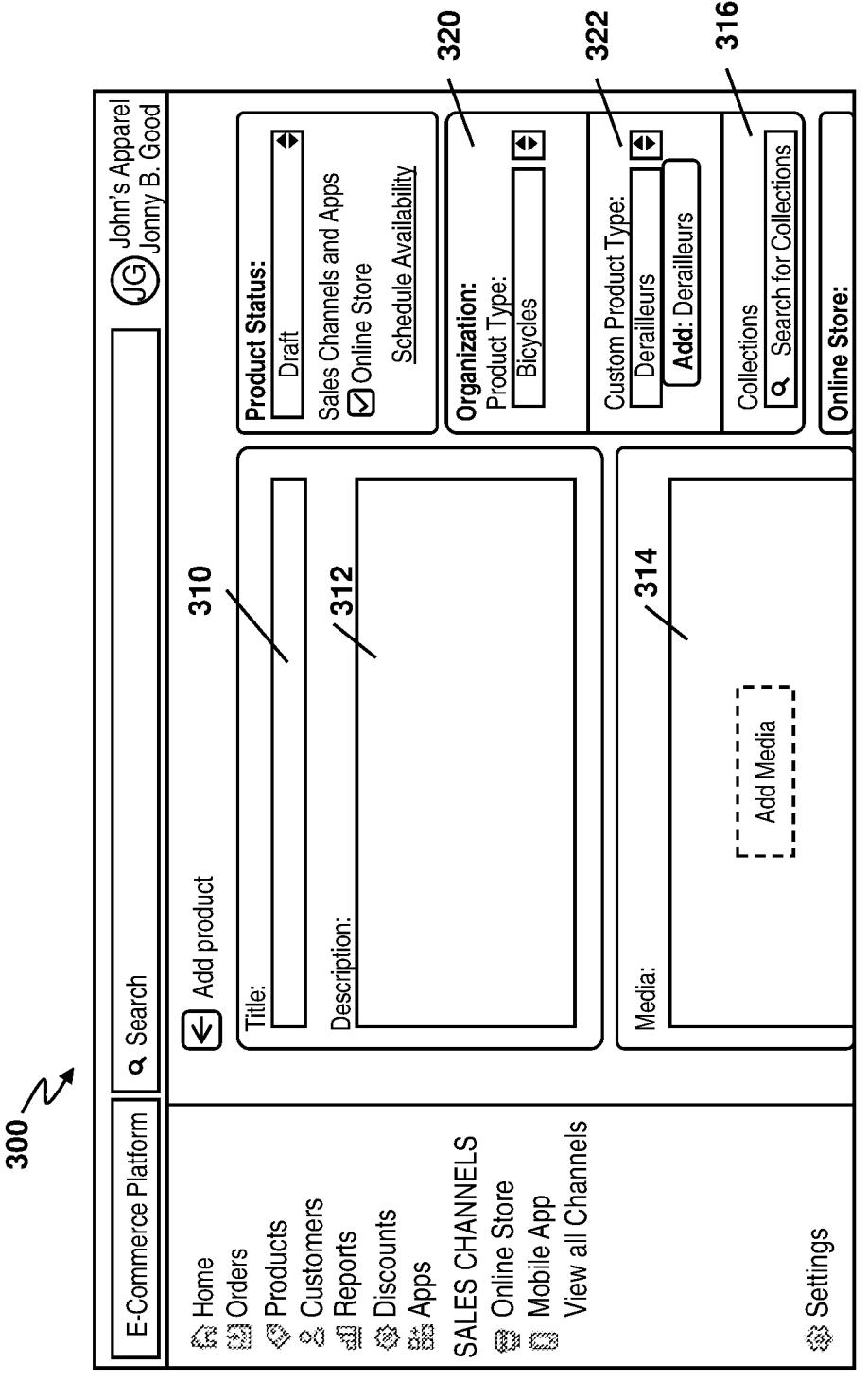
FIG. 3 is a block diagram showing an example interface for a merchant to add a product using the e-commerce platform of FIG. 1.

Utilizing an ecommerce platform such as the one described with regard to FIGS. 1 and 2 above, a merchant may add a new product. For example, the merchant may click on the "Products" link in the left column of FIG. 2, which, in some cases, may then present the merchant with all of the products in their electronic storefront. Further an option may be presented to the merchant to add a new product. If the merchant selects the option to add a new product, a user interface such as the one provided in FIG. 3 may be presented to the merchant. Reference is now made to FIG. 3.

In the embodiment of FIG. 3, a user interface 300 is provided which allows a merchant to add a new product to their storefront. For example, the merchant may be allowed to add a title in box 310, a description in box 312, media such as one or more photographs, videos, sound clips among other options in box 314, whether the product is part of a collection in box 316, or other information such as inventory amounts, barcodes or stock keeping units (SKUs), whether the product should be placed in the storefront immediately, tags, among other information.

In accordance with various embodiments of the present disclosure, a merchant may be presented with a suggested product category in block 320. The suggested product category may be based on the information input into the user interface 300, including text, for example from the title block 310 or the description block 312, or media from the media block 314, among other information.

In various embodiments, the merchant would have the option to accept the suggested product category or to choose a different product category. Further, in some cases, the merchant may be allowed to enter a custom product category in block 322. For example, if the merchant is a specialized merchant, then the standard taxonomy may not include a granularity necessary for the particular merchant, or the merchant may be in a new area that is not captured by the standard taxonomy, and therefore the merchant may specify a custom product category along with the standard product category.

Other options are possible.

Figure 4:
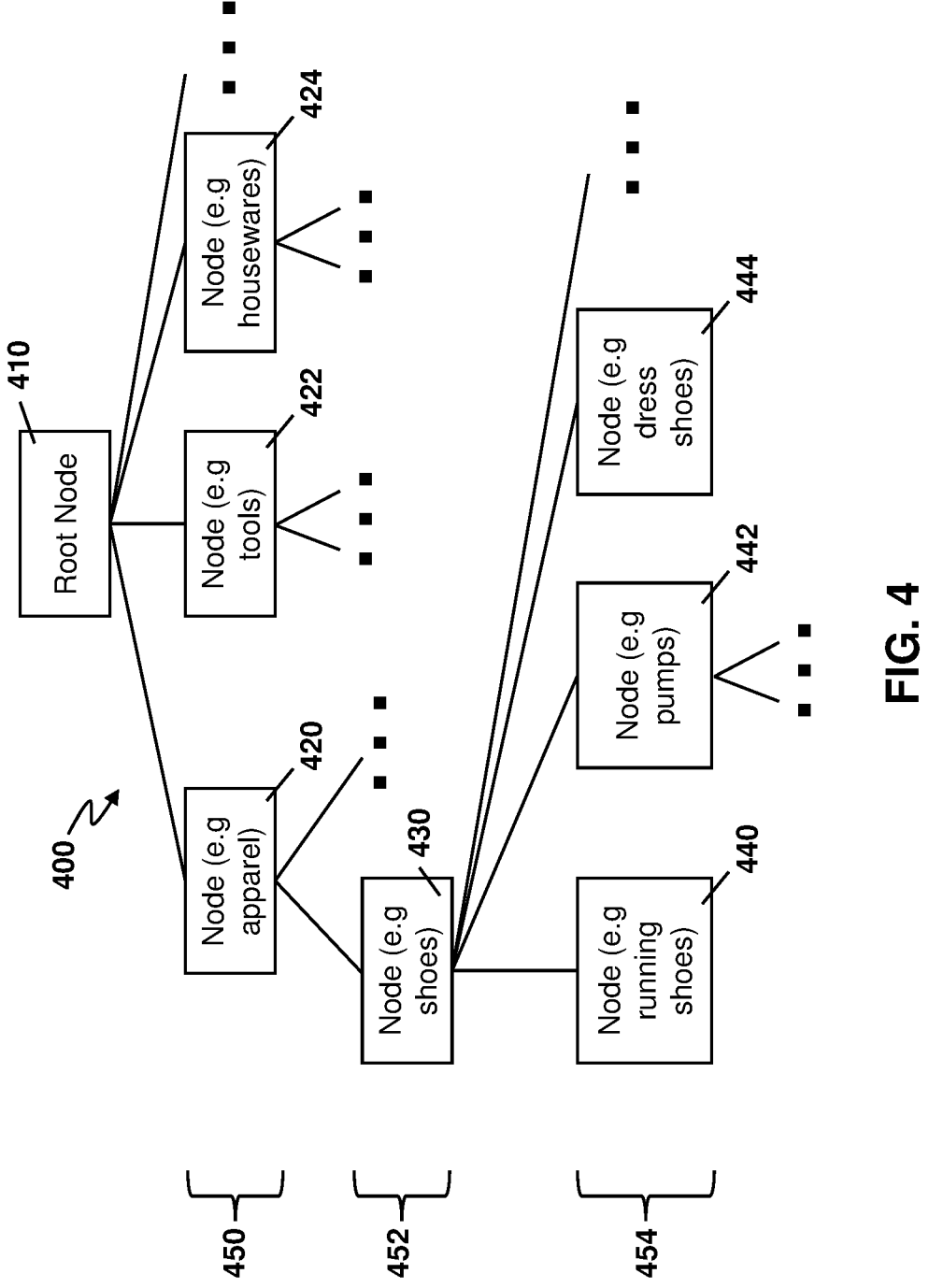
FIG. 4 is a block diagram showing a simplified example of a standard taxonomy for an e-commerce platform.

As described above, categorization is an important aspect of an electronic storefront, as categories may be used as a filter or facet on a search and allow potential purchasers to find a product quickly and also to present other similar products to the potential purchaser; categories may be used for defining the type of attributes needed from a potential purchaser for the type of products; categories may also be used in analytics to understand buyer preferences; and/or product categorization may define workflows for the products. Categories presented to a merchant when adding or modifying product information may be part of a standard taxonomy. Reference is now made to FIG. 4.

The example of FIG. 4 shows a standard taxonomy 400 in which a root node 410 provides the base of the tree. More granularity is introduced as the number of nodes between a given node and this root node 410 increases. For example, in the embodiment of FIG. 4, node 420 represents a general apparel category, node 422 represents a general tools category, node 424 represents a general housewares category, among other options.

Each of nodes 420, 422 and 424 may include child nodes. For simplicity, only node 430, shown as a child node of node 420, is provided in the example of FIG. 4. Node 430 represents a category for shoes.

Under node 430, various child nodes exist. These include a running shoes node 440, a pumps node 442, and a dress shoes node 444, among other options.

In some cases, the standard taxonomy may end at such child node. In other cases, the child node may have further children.

In accordance with the embodiments of the present disclosure, nodes may be organized by levels within the standard taxonomy hierarchy. Such levels may also, in some cases, be referred to as tiers. For example, a first level 450 may include the nodes directly under the root node (or may form the root nodes). A level 452 may include the children of nodes within level 450. A level 454 may include children of nodes within level 452. Further levels (not shown) may exist under level 454.

A standard node may be a data structure that provides information within a tree hierarchy. For example, reference is now made to FIG. 5.

Figure 5:
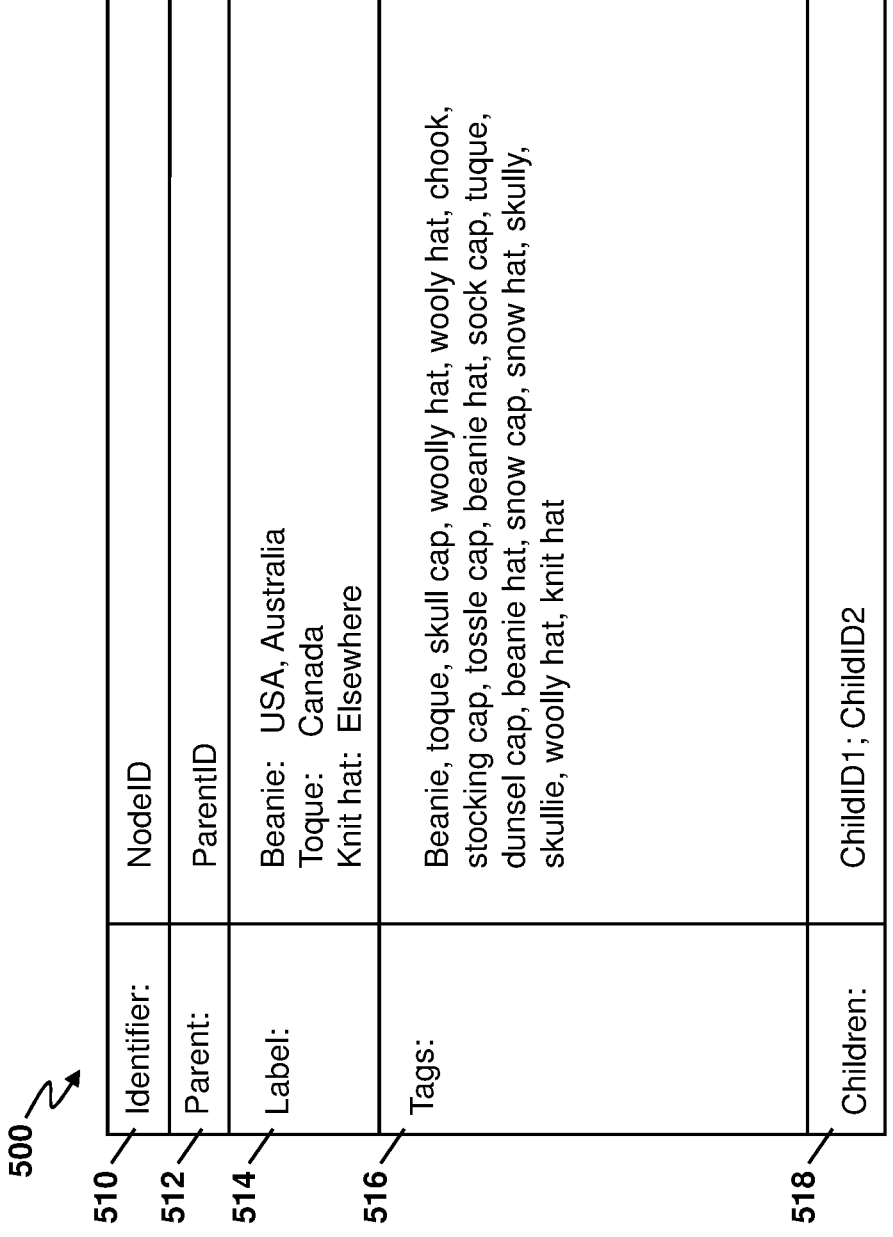
FIG. 5 is a block diagram showing an example node capable of being used with the embodiments of the present disclosure.

The embodiment of FIG. 5 shows an example node 500 which includes an identifier 510. Identifier 510 may be any unique identifier within the tree structure to identify the node. For example, the identifier may be a number, a label, a uniform resource identifier (URI), among other options.

The example of FIG. 5 further provides for a parent 512 to be identified utilizing the unique identifier for the parent, shown as parentID.

The example of a FIG. 5 further provides for a label 514 for the node. The label may be a single string for the tree, or may be conditional based on various criteria. For example, in FIG. 5, the label is identified based on a geographic location. Thus, the label for a woolen hat may be a "Beanie" for the USA and Australia; a "Toque" for Canada; and a "Knit hat" elsewhere. Other conditional information may include a language preference. For example, if a merchant is utilizing the product addition page utilizing Spanish as the default language, the label may be presented to the merchant in Spanish when adding a new product. While the example of FIG. 5 shows the label with only English strings, in some embodiments the label may be defined in multiple languages.

Therefore, label 514 may be a list of strings with one or more conditions attached thereto. A computing device presenting the label to a merchant or customer may scroll through the conditions to find the appropriate label. In some cases, a default or catch-all label may be provided if none of the conditions are met.

Further, in the example of FIG. 5, tags 516 are provided. Tags 516 may include the strings that are represented in the labels 514, but may also include synonyms, alternative spellings, translations into various languages, among other such information in some cases.

In some embodiments, tags 516 are optional and may be grouped with labels or may not be included at all.

Further, in the example of FIG. 5, children 518 are provided within a node 500. Children 518 may include zero, one or more children for the node.

However, in some cases, a node 500 may not define its children, as a link between a parent node and child node would be included in the child node using parent field 512. Similarly, in some cases parent field 512 is optional if the children field 518 is used. Therefore, the link between a parent node and a child node can be defined in both the parent node and the child node, in only the parent node, or only in the child node.

The embodiment and structure of a node 500 in FIG. 5 is merely provided as one example of a node, and the present disclosure is not limited to the particular structure of a node. Therefore, other node structures could equally be used with the embodiments of the present disclosure. Further, the node 500 could include other fields that are not included in the example of FIG. 5.

Merchant Product Information

Figure 6:
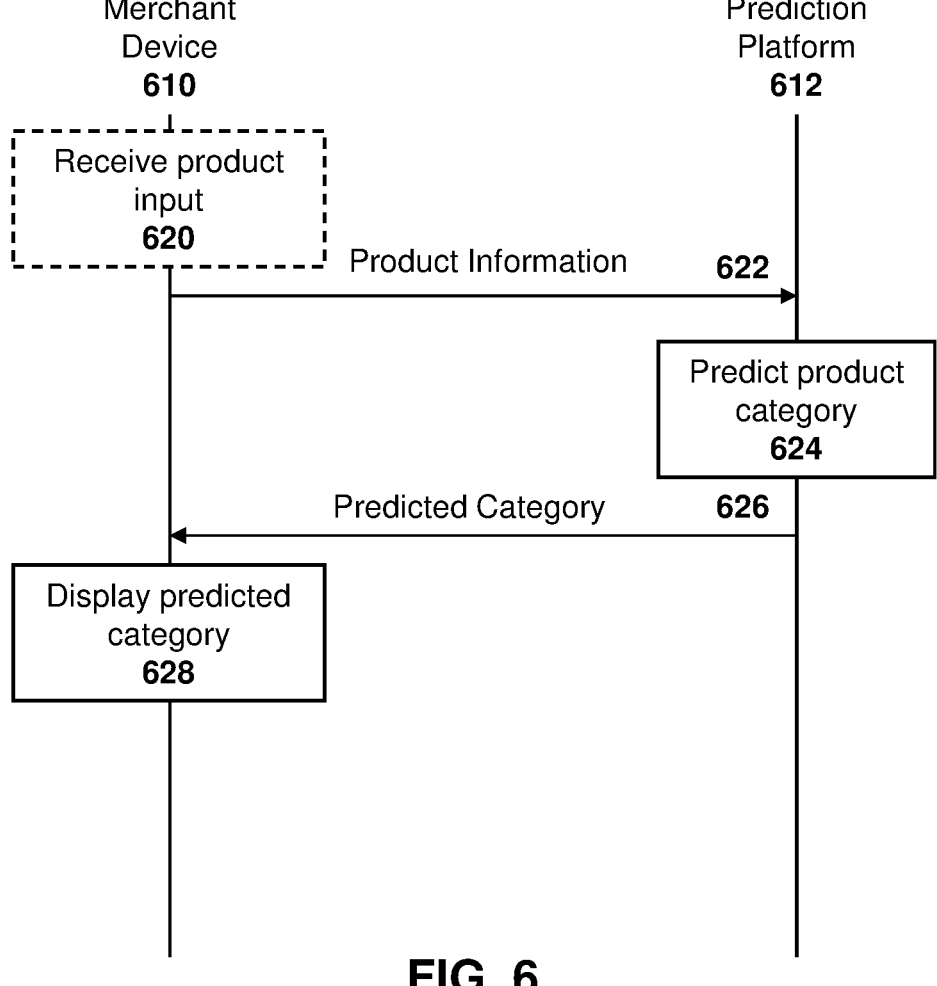
FIG. 6 is a dataflow diagram showing a process for providing information to a prediction platform, determining and returning a predicted category for a product.

Utilizing a categorization topology and node structure, for example as shown above, a product characterization system is provided which offers product category suggestions while a merchant is entering new product information into the e-commerce site or platform. The suggestions offer a product category at an appropriate hierarchy level, and may in some cases be based on the confidence of the category prediction. Reference is now made to FIG. 6.

In the embodiment of FIG. 6, a web server, client device, or platform that a merchant is interacting with, is referred to as merchant device 610. The merchant may enter information about a new product or service that the merchant will be offering for sale, for example using the interface described with regards to FIG. 3. The entering of such product input is shown, for example, at block 620. However, in some embodiments the entering of product input information at block 620 is optional. For example, if an e-commerce platform is reclassifying a merchant's electronic storefront, then the merchant may not necessarily need to input new information but rather the information may be found from the merchant's electronic storefront. Other options for the provision of information about a product are also possible.

Product or service information may include text inputs such as a title found in box 310, a description found in box 312, tags, a product type entered by a merchant, a product vendor, or product collections, other similar information. Such product or service information may further include uploading media files such as pictures, video, virtual-reality models, among other such data, for example found in box 314.

In some cases, as the user or merchant enters information into merchant device, the information may be sent to the prediction platform in message 622. However, in some cases message 622 may be sent after the merchant has finished entering information.

The prediction platform may then analyze each new piece of information received in message 622 at block 624. An example of such analysis is described below.

If the information received at block 622 is additional information to information previously received about the product being entered by a merchant, the prediction platform may combine this new information with the previous information submitted, to re-evaluate or refine suggestions. Specifically, the merchant device 610 may interact with a prediction platform 612 through various interface or query types in order to provide information in one or more messages 622 to the prediction platform.

Further, in some cases, the input by the merchant at block 620 may be batched or grouped prior to being sent to the prediction platform 612. For example, a threshold number of characters may be required prior to sending the information to the prediction platform. Thus, the information may be provided when a certain threshold level of text has been entered, when new images or media have been provided, or at other points during the merchant's interaction with the merchant device 610. However, in other cases the information may be updated in real time without threshold limits.

The prediction platform 612 may receive the query in one or messages 622 and may then use one or more machine learning modules or other predictive modules to determine a probable product category for the new item being entered.
Prediction of Category As described above with regards to FIG. 4, product categories may be stored in a hierarchical manner, where, for example, "shoes" may belong to "apparel and accessories", and "sneakers" may belong to "shoes", etc.

In some cases, the prediction platform may have a separate machine learning model for each tier or level in such a hierarchy.

Typically, a machine learning model will utilize vectorization to convert various information into and input for the machine learning model. Typically, both text and image features cannot be used by most machine learning modules in their raw state.

In this regard, pre-trained image and text models may be used to convert raw features into embeddings to be further used for hierarchical classification. Non-limiting examples include multilingual BERT (Bidirectional Encoder Representations from Transformers) for text and MobileNet-V2 for images.

Further, in accordance with various embodiments of the present disclosure, the architecture for the machine learning model may be based on several principles. A first principle is that the multiclass nature of the problem of classification may be preserved to assist in the classification problem. A second principle is that learning of parent nodes may help in predicting a child node. For example, it may be easier to predict a product as "dog beds" if the product has been predicted to fall under the parent "dog supplies" node.

In this regard, one example classification model utilizes a multi-task approach where each level of the taxonomy may be treated as a separate classification problem and the output of each layer could then be fed back into the next model to make the next level prediction. Further, in some cases, the problem may be classified as a multi-class problem, where each level in the taxonomy contains a varying number of classes to choose from, so each task becomes a single multi-class classification problem.

Figure 7:
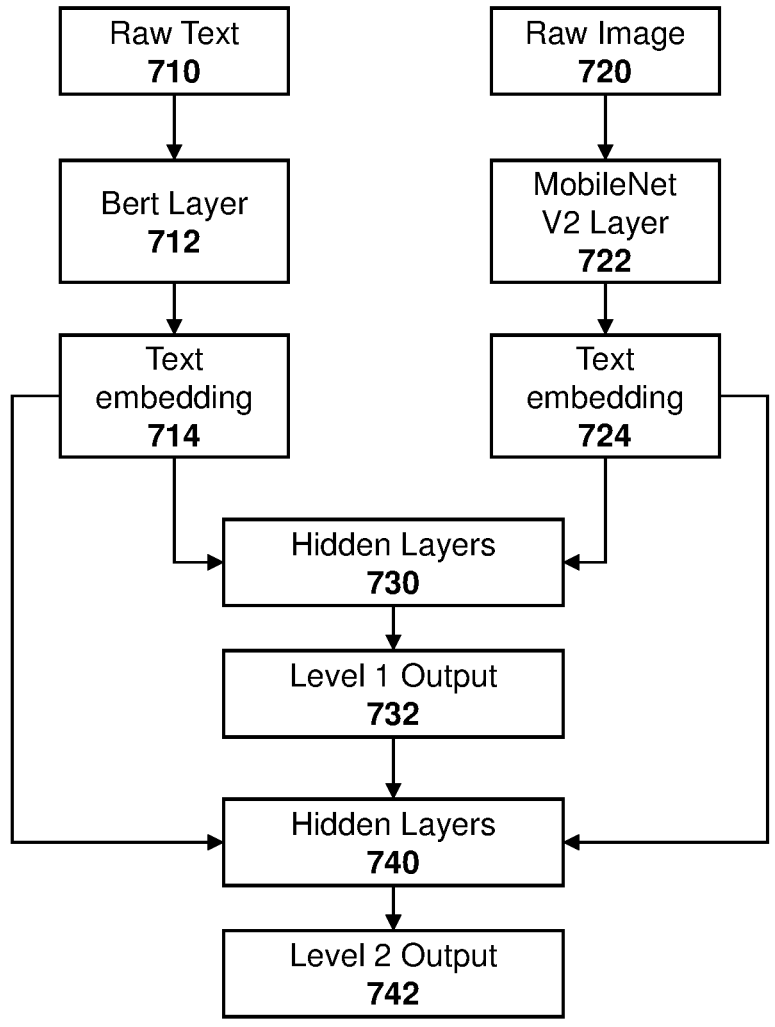
FIG. 7 is a block diagram showing the training of a machine learning model.

Reference is now made to FIG. 7. In the embodiment of FIG. 7, raw text, shown at block 710 is provided through a BERT layer 712 to create a text embedding 714.

Similarly, a raw image shown at block 720 is provided through a MobileNet-V2 layer 722 to create an image embedding 724.

In the example of FIG. 7, the text embeddings 714 and image embeddings 724 are provided through A plurality of hidden layers 730 to create a multi-class output layer for a level 1 prediction, shown at block 732.

The output for the level 1 prediction, along with the text embeddings 714 and the image embeddings 724 may be then provided into subsequent hidden layers 740 to predict a level 2 output shown at block 742. Depending on the number of layers in the taxonomy hierarchy, the feedback loop could be continued all the way to the lowest level. For example, the Google™ Product Taxonomy (GPT) has seven layers that could be utilized.

Utilizing the embodiment of FIG. 7, each of the output layers may correspond to the various layers in the taxonomy. Further, each output layer would have its own loss function associated with it.

During the forward pass of the example of FIG. 7, parent nodes may influence the outputs of child nodes.

Further, during backpropagation, the losses of all seven open layers may be combined in a weighted fashion to arrive at a single loss value that is used to calculate gradients. This means that a lower level performance can influence weights of higher level layers and nudge the model in the right direction.

During training, the parent node prediction may be fed to the child node prediction tasks in order to influence those predictions, and no hard constraints are imposed on the child node based on the previous level prediction. As an example, the model of FIG. 7 is allowed to predict level two as "pet supplies" even if the prediction for level one was "arts and entertainment". During training this allows the prediction of the child nodes to nudge an incorrect prediction of the parent nodes in a better direction. Specifically, the prediction of a child node in a lower level can be applied against predictions in a higher level to allow the higher level values to be adjusted.

Further, during training, an imbalance of classes using class weights can be handled. In particular, if a data set used in training is imbalanced, it makes it more difficult to train a classifier that generalizes. Adding class weights enables the mitigation of effects of class imbalance. By providing class weights, the model is able to penalize errors in predicting classes that have fewer samples, thereby overcoming the lack of observations in those classes.

While the embodiment of FIG. 7 may be used for training, where the model does not constrain following the hierarchy strictly, once the model is trained, such behavior may not be allowed in order to provide a smooth and reliable experience for merchants. In order to do this, additional steps are provided during the inference of the classification based on inputs from the merchant.

Figure 8:
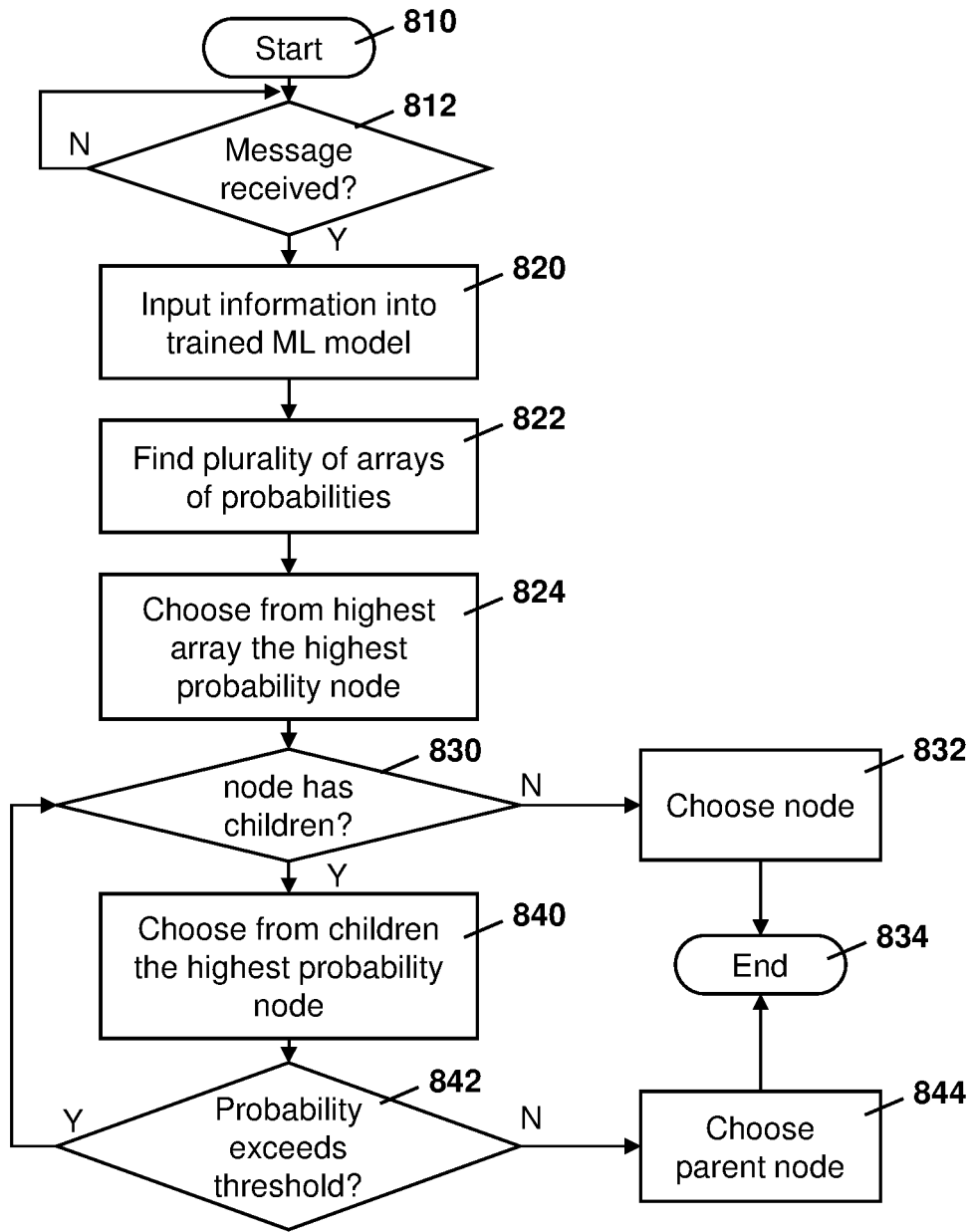
FIG. 8 is a process diagram showing an example process for determining a predicted category.

Specifically, referring to FIG. 8, various steps may be used for class predictions. In particular, the overall principle for the example of FIG. 8 is that the model will make raw predictions from the trained model, returning a plurality of arrays of confidence scores, each representing a level of the taxonomy hierarchy. Therefore, each array represents one level of the taxonomy.

The trained machine learning model may then choose the category that has the highest confidence score at level one and designate that as the level 1 prediction.

The trained machine learning model may then collect the immediate descendants of the level 1 prediction. From among these, the child that has the highest confidence score may be chosen and designated as the level 2 prediction. This may be continued until all levels have been exhausted.

Further, in some cases, the confidence score may need to meet a threshold to be returned as a prediction. The threshold may be a predetermined value over which the confidence level must be to return the node. In some cases, the threshold may vary depending on a branch of the tree, a level of the tree, among other factors. For example, certain branches of a tree may be more sensitive than other branches and may require higher confidence scores than other areas in some embodiments.

In FIG. 8, the process starts at block 810 and proceeds to block 812 in which a check is made to determine whether the prediction platform has received a message. For example, the message may be message 622 from the embodiment of FIG. 6. However, the message may be any data input to the prediction platform in other cases.

From block 812, if a message is not received, the process continues to loop back to block 812.

Once a message is received, the process proceeds from block 812 to block 820 in which the information from the message is input into the machine learning module.

The process then proceeds to block 822 in which a plurality of arrays are output from the machine learning module. For example, if there are seven layers in the hierarchy, seven arrays of confidence scores may be output at block 822.

Figure 9:
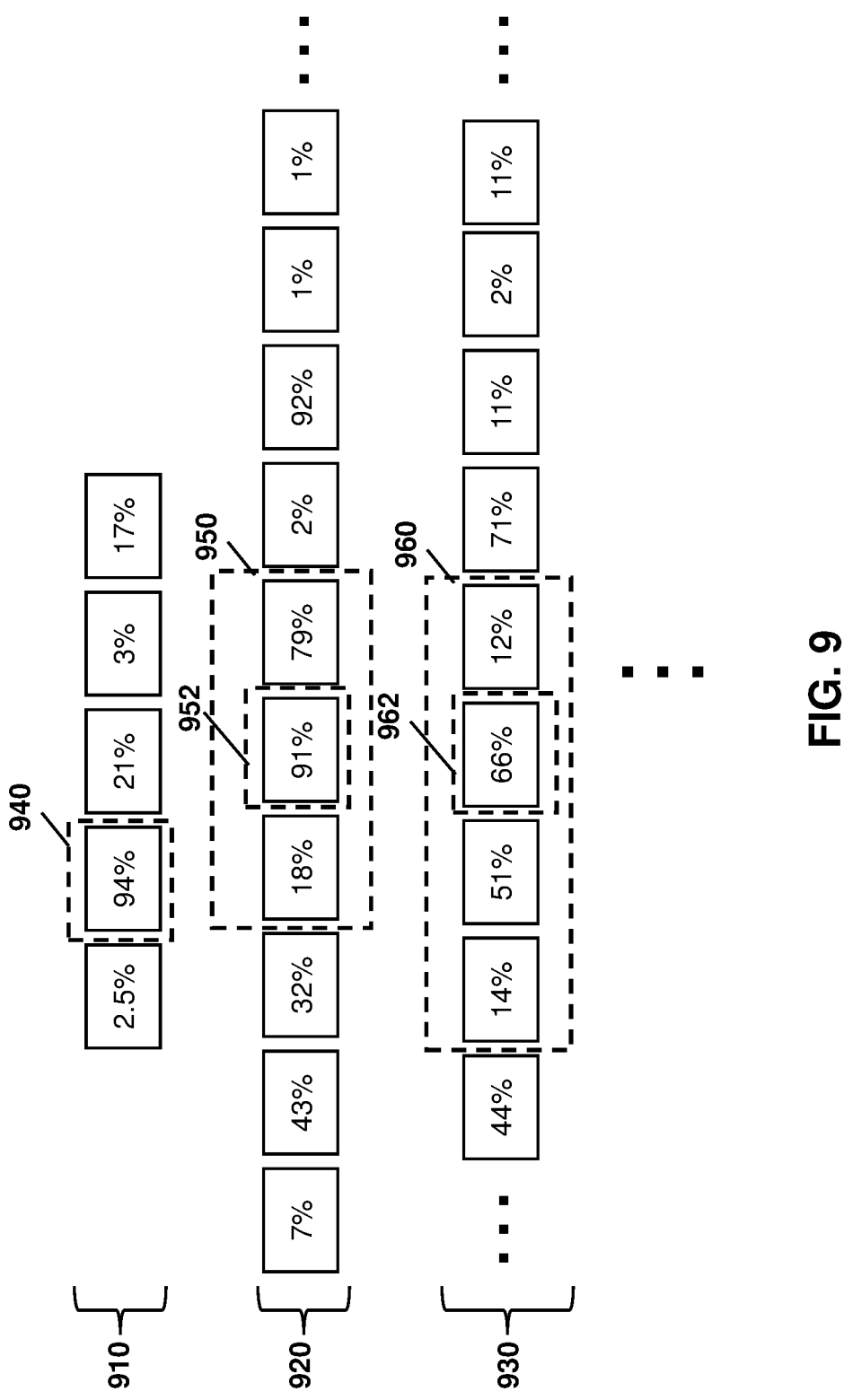
FIG. 9 is a block diagram showing an example set of arrays of confidence scores for nodes in a hierarchical taxonomy.

An example of such arrays is shown with regard to FIG. 9. In particular, in FIG. 9, a top layer array 910 may provide confidence scores for layer one in the hierarchy. A second layer array 920 may provide confidence scores for layer two in the hierarchy. A third layer array 930 may provide confidence scores for a third layer in the hierarchy. Similar arrays could be provided for the remaining layers in the hierarchy.

Referring again to FIG. 8, from block 822 the process proceeds to block 824 in which the highest confidence score is chosen in the top level array. For example, in the plurality of arrays in FIG. 9, top layer array 910 has a confidence score of 94% as the highest confidence score, shown with block 940.

Once the highest confidence score is chosen, the process proceeds from block 824 to block 830 in which a check is made to determine whether the chosen node has any children. If not, the process proceeds to block 832 in which the chosen node is returned, for example to a merchant device. The process then proceeds to block 834 and ends.

Conversely, if the node has children as determined at block 830, the process proceeds to block 840 in which the children of the node from the previous layer are found and the highest confidence level for these children is chosen. For example, in FIG. 9, block 950 shows the children of the node chosen at block 940. The highest confidence score within this block is shown as block 952.

From block 840, the process proceeds to block 842 in which a check is made to determine whether the probability or confidence score of the selected child node exceeds a threshold. For example, an ecommerce platform may determine that the confidence score must exceed 75% in order to return the predicted classification. However, the value of 75% is merely being used for illustration and the administrators of the e-commerce platform may choose any threshold values. Therefore, the check at block 842 would find whether the confidence score of the child node exceeded the predetermined threshold. If it does not, then the child node is not a good enough prediction, and the process proceeds from block 842 to block 844 in which the parent node is chosen as the node to return to the merchant device. The process then proceeds to block 834 and ends.

From block 842, if the probability does exceed the threshold, then the process may recursively proceed back to block 830 to determine whether the chosen child node has any children, and whether the confidence score for those children exceeds the threshold.

Specifically, referring again to FIG. 9, if the array 920 causes the selection of block 952, then the children of such node are shown with block 960 with an array 930. In this case, the highest confidence score shown at block 962 is 66%. Such value may not exceed the threshold and therefore the node associated with block 952 may be returned as the classification prediction.

Therefore, utilizing the example of FIG. 9, only the second layer prediction is surfaced since the third layer prediction does not meet the minimum confidence threshold.

While the above provides one example machine learning model, other examples of machine learning models could be used with the embodiments of the present disclosure. For example, the machine learning models may be binary classifiers, such that each model simply outputs a yes/no that a given sample belongs to the one product category the model is trained to recognize.

Alternatively, the machine learning models could be multiclass classifiers which recognize more than one product category and output which one of the multiple categories the given sample is most likely to belong to, along with a certainty value.

Based on such model or models, a suggested category node can be found, along with a confidence score in some cases. As more information is provided to the prediction platform, the suggested category node and/or the confidence score may change.

Further, utilizing such machine learning or predictive modules can, in some cases, overcome ambiguities in the input that is being provided by a merchant.

In some cases, a previously suggested category may be refined to a lower-level category or potentially different category altogether with the newly available information.

Display of Predicted Category

The probable product category, along with a confidence score in some cases, may then be returned to the merchant device. Reference is again made to FIG. 6.

In particular, once the prediction platform 612 has predicted the product category at block 624, then the predicted category may be returned to the merchant device 610, shown with message 626.

Such probable product category may then be presented to the user or merchant, as shown with block 628. In some cases, the suggestion may be provided to the merchant regardless of the confidence level. In other cases, in order for a category to be suggested to a merchant for a given product or service, the prediction must meet a confidence threshold. If the probable product category does not meet the confidence threshold then no product category is suggested to the merchant or user.

A user interface on the merchant device 610 may then be updated to include the inferred product category. The suggestion presented to a merchant or user may be in the form of a "card" or selection/field on the "Add Product" page of the commerce platform's administration, or in other cases may be a notification/pop up/banner, among other such options.

A merchant interacting with the user interface may in some cases then confirm the product category, moving the product category from an inferred state to a true state. Specifically, the product category suggestion can be accepted, rejected or modified by a merchant.

The acceptance, rejection or modification may be input back to the machine learning models for training purposes in some cases. For example, if a merchant rejects the suggested product category, the rejection can be provided back to the prediction platform 612 and used in the machine learning algorithm to refine the product category suggestion.

While the embodiment FIG. 6 only shows a single message from merchant device to prediction platform 612 and a single returned predicted category, in various embodiments the process could repeat itself when the merchant enters further information and the predicted category may change based on this further information.

In this way, product category suggestions may be presented to merchant as input is added to a product page utilizing a prediction platform having one or more machine learning modules or prediction modules. In some cases, accuracy thresholds may be specified for the product category suggestions.

Computing Device

The above-discussed methods are computer-implemented methods and require a computer for their implementation/use. Such computer system could be implemented on any type of, or combination of, network elements or computing devices. For example, one simplified computing device that may perform all or parts the embodiments described herein is provided with regard to FIG. 10.

Figure 10:
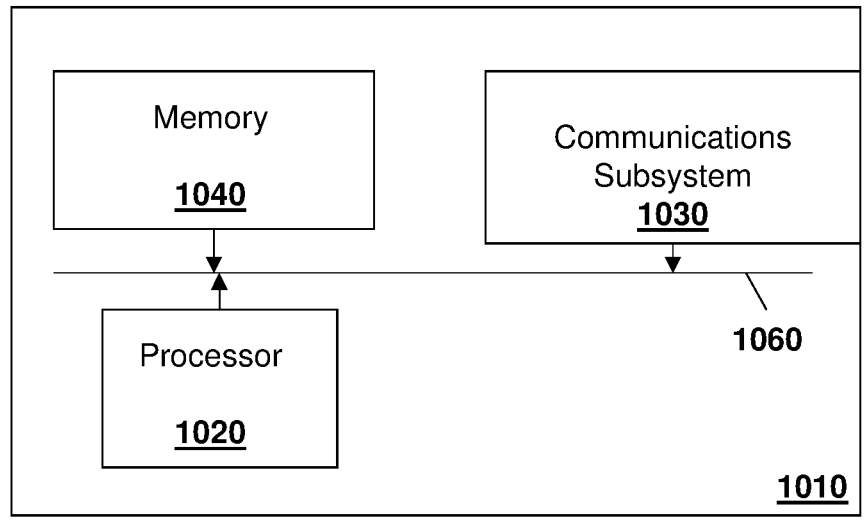
FIG. 10 is a block diagram showing a simplified computing device capable of being used with the embodiments of the present disclosure.

In FIG. 10, computing device 1010 includes a processor 1020 and a communications subsystem 1030, where the processor 1020 and communications subsystem 1030 cooperate to perform the methods of the embodiments described herein.

The processor 1020 is configured to execute programmable logic, which may be stored, along with data, on the computing device 1010, and is shown in the example of FIG. 10 as memory 1040. The memory 1040 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1020 may also be implemented entirely in hardware and not require any stored program to execute logic functions. Memory 1040 can store instruction code, which, when executed by processor 1020 cause the computing device 1010 to perform the embodiments of the present disclosure.

Alternatively, or in addition to the memory 1040, the computing device 1010 may access data or programmable logic from an external storage medium, for example through the communications subsystem 1030.

The communications subsystem 1030 allows the computing device 1010 to communicate with other devices or network elements. In some embodiments, communications subsystem 1030 includes receivers or transceivers, including, but not limited to, ethernet, fiber, Universal Serial Bus (USB), cellular radio transceiver, a Wi-Fi transceiver, a Bluetooth transceiver, a Bluetooth low energy transceiver, a GPS receiver, a satellite transceiver, an IrDA transceiver, among others. As will be appreciated by those in the art, the design of the communications subsystem 1030 will depend on the type of communications that the transaction device is expected to participate in.

Communications between the various elements of the computing device 1010 may be through an internal bus 1060 in one embodiment. However, other forms of communication are possible.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

In particular, some embodiments of the present disclosure are provided in the following clauses.

Clause AA: A method at a computing device for identifying a hierarchical tree node as user input is received, the method comprising: sending a message to a prediction platform, the message containing at least a subset of the user input; receiving, from the prediction platform, a suggested hierarchical tree node; and displaying, on a user interface for the computing device, the suggested hierarchical tree node.

Clause BB: The method of clause AA, further comprising waiting until a threshold level of user input is received prior to the sending the message.

Clause CC: The method of clause AA, wherein the receiving further comprises a confidence score, and wherein the method further comprises determining that the confidence score exceeds a threshold prior to the displaying.

Clause DD: The method of clause CC, wherein the threshold differs based on the suggested hierarchical tree node.

Clause EE: The method of clause AA, wherein the sending comprises at least one of: text information; an image; a video; and a virtual reality model.

Clause FF: The method of clause AA, further comprising: receiving one of an approval; a rejection; or a modification of the suggested hierarchical tree node; and providing the approval; the rejection; or the modification of the suggested hierarchical tree node to the prediction platform.

Clause GG: The method of clause AA, further comprising repeating the sending, receiving and displaying as more user input is received.

Clause HH: The method of clause AA, wherein the displaying comprises at least one of a card on the user interface; a field on the user interface; a notification; a pop up; and a banner.

Clause II: The method of clause AA, wherein the hierarchical tree node is a product category node in an electronic commerce platform.

Clause JJ: A computing device for identifying a hierarchical tree node as user input is received, the computing device comprising: a processor; and a communications subsystem, wherein the computing device is configured to send a message to a prediction platform, the message containing at least a subset of the user input; receive, from the prediction platform, a suggested hierarchical tree node; and display, on a user interface for the computing device, the suggested hierarchical tree node.

Clause KK: The computing device of clause JJ, wherein the computing device is further configured to wait until a threshold level of user input is received prior to the sending the message.

Clause LL: The computing device of clause JJ, wherein the computing device is configured to receive a confidence score, and wherein the computing device is further configured to determine that the confidence score exceeds a threshold prior to the displaying.

Clause MM: The computing device of clause LL, wherein the threshold differs based on the suggested hierarchical tree node.

Clause NN: The computing device of clause JJ, wherein the computing device is configured to send using at least one of: text information; an image; a video; and a virtual reality model.

Clause OO: The computing device of clause JJ, wherein the computing device is further configured to receive one of an approval; a rejection; or a modification of the suggested hierarchical tree node; and provide the approval; the rejection; or the modification of the suggested hierarchical tree node to the prediction platform.

Clause PP: The computing device of clause JJ, wherein the computing device is further configured to repeat the sending, receiving and displaying as more user input is received.

Clause QQ: The computing device of clause JJ, wherein the computing device is configured to display using at least one of a card on the user interface; a field on the user interface; a notification; a pop up; and a banner.

Clause RR: The computing device of clause JJ, wherein the hierarchical tree node is a product category node in an electronic commerce platform.

Clause SS: A computer readable medium for storing instruction code, which, when executed by a processor of a computing device configured for identifying a hierarchical tree node as user input is received cause the computing device to: send a message to a prediction platform, the message containing at least a subset of the user input; receive, from the prediction platform, a suggested hierarchical tree node; and display, on a user interface for the computing device, the suggested hierarchical tree node.

The invention claimed is:

1. A method comprising:

training a machine learning model to predict classes in a taxonomy tree, wherein the machine learning model comprises hidden layers connected to output layers, the training comprising:

configuring each of the output layers of the machine learning model to correspond to different levels of the taxonomy tree, wherein nodes in the levels of the taxonomy tree correspond to categories in the taxonomy tree and subcategories of a given node of the taxonomy tree form a subtree of the given node;

configuring an output of a given output layer of the machine learning model to be fed into subsequent hidden layers of the machine learning model; and adding class weights to mitigate class imbalances in a dataset used in the training; and determining, using the trained machine learning model, a predicted category in the taxonomy tree for an item.

2. The method of claim 1, wherein the training further comprises:

treating each level of the taxonomy tree as a separate classification problem; and providing feedback to a lower level of the taxonomy tree based on classification in a higher level of the taxonomy tree.

3. The method of claim 2, further comprising, upon determining a tier prediction, inputting the tier prediction and information into the machine learning model to obtain updated arrays.

4. The method of claim 1, wherein the training further comprises:

using backpropagation to influence a weight given to a higher level of the taxonomy tree.

5. The method of claim 1, wherein determining a predicted category further comprises:

receiving a message at a computing device, the message containing information for the item;

inputting the information for the item into the trained machine learning model;

receiving a plurality of arrays from the machine learning model, each array of the plurality of arrays representing a level of the taxonomy tree, each array consisting of values corresponding to nodes at that level of the taxonomy tree and representing likelihoods that the item should be categorized in respective ones of the categories corresponding to the nodes at that level of the taxonomy tree;

traversing the taxonomy tree based on the plurality of arrays to determine a predicted category, the traversal including:

choosing, from an array representing a highest level tier, a category having a highest likelihood, thereby designating a tier prediction;

traversing the tree wherein for a given tier prediction it is determined whether a highest likelihood from children of that tier prediction as collected from arrays representing that level exceeds a threshold and, if so, the category corresponding to that highest likelihood becomes the tier prediction and otherwise the given tier prediction is selected as the predicted category; and returning, from the computing device, the predicted category.

6. The method of claim 5, wherein the threshold varies between each category in each level.

7. The method of claim 5, wherein the training further comprises:

separating text and multimedia from the message;

feeding each of the text and multimedia into separate of the hidden layers in the machine learning model; and combining the results from the separate hidden layers to provide an output from the level at an output layer.

8. The method of claim 1, wherein the hidden layers of the machine learning model correspond to the hidden layers of at least one neural network, wherein the training of the machine learning model further comprises training the at least one neural network.

9. The method of claim 1, wherein the machine learning model further comprises a pre-trained text model to create a text embedding from raw text and a pre-trained image model to create an image embedding from a raw image, wherein the text embedding and the image embedding are provided to the hidden layers of the machine learning model.

10. A system comprising:

at least one processor;

a communications subsystem;

wherein the at least one processor is configured to:

train a machine learning model to predict classes in a taxonomy tree, wherein the machine learning model comprises hidden layers connected to output layers, the training comprising:

configure each of the output layers of the machine learning model to correspond to different levels of the taxonomy tree, wherein nodes in the levels of the taxonomy tree correspond to categories in the taxonomy tree and subcategories of a given node of the taxonomy tree form a subtree of the given node;

configure an output of a given output layer of the machine learning model to be fed into subsequent hidden layers of the machine learning model; and add class weights to mitigate class imbalances in a dataset used in the training; and determine, using the trained machine learning model, a predicted category in the taxonomy tree for an item.

11. The system of claim 10, wherein the training further comprises:

treating each level of the taxonomy tree as a separate classification problem; and providing feedback to a lower level of the taxonomy tree based on classification in a higher level of the taxonomy tree.

12. The system of claim 11, wherein the training further comprises:

using backpropagation to influence a weight given to a higher level of the taxonomy tree.

13. The system of claim 11, the at least one processor further configured to, upon determining a tier prediction, input the tier prediction and information into the machine learning model to obtain updated arrays.

14. The system of claim 10, wherein determining a predicted category further comprises:

receiving a message at a computing device, the message containing information for the item;

inputting the information for the item into the trained machine learning model;

receiving a plurality of arrays from the machine learning model, each array of the plurality of arrays representing a level of the taxonomy tree, each array consisting of values corresponding to nodes at that level of the taxonomy tree and representing likelihoods that the item should be categorized in respective ones of the categories corresponding to the nodes at that level of the taxonomy tree;

traversing the taxonomy tree based on the plurality of arrays to determine a predicted category, the traversal including:

choosing, from an array representing a highest level tier, a category having a highest likelihood, thereby designating a tier prediction;

traversing the tree wherein for a given tier prediction it is determined whether a highest likelihood from children of that tier prediction as collected from arrays representing that level exceeds a threshold and, if so, the category corresponding to that highest likelihood becomes the tier prediction and otherwise the given tier prediction is selected as the predicted category; and returning, from the computing device, the predicted category.

15. The system of claim 14, wherein the threshold varies between each category in each level.

16. The system of claim 14, wherein the training further comprises:

separating text and multimedia from the message;

feeding each of the text and multimedia into separate of the hidden layers in the machine learning model; and combining the results from the separate hidden layers to provide an output from the level at an output layer.

17. The system of claim 10, wherein the hidden layers of the machine learning model correspond to the hidden layers of at least one neural network, wherein the training of the machine learning model further comprises training the at least one neural network.

18. The system of claim 10, wherein the machine learning model further comprises a pre-trained text model to create a text embedding from raw text and a pre-trained image model to create an image embedding from a raw image, wherein the text embedding and the image embedding are provided to the hidden layers of the machine learning model.

19. One or more non-transitory computer readable media having stored thereon computer-executable instructions that, when executed by at least one processor, cause the at least one processor to perform a method comprising:

train a machine learning model to predict classes in a taxonomy tree, wherein the machine learning model comprises hidden layers connected to output layers, the training comprising:

configure each of the output layers of the machine learning model to correspond to different levels of the taxonomy tree, wherein nodes in the levels of the taxonomy tree correspond to categories in the taxonomy tree and subcategories of a given node of the taxonomy tree form a subtree of the given node;

configure an output of a given output layer of the machine learning model to be fed into subsequent hidden layers of the machine learning model; and add class weights to mitigate class imbalances in a dataset used in the training; and determine, using the trained machine learning model, a predicted category in the taxonomy tree for an item.

20. The one or more non-transitory computer readable media of claim 19, wherein determining a predicted category further comprises:

receiving a message at a computing device, the message containing information for the item;

inputting the information for the item into the trained machine learning model;

receiving a plurality of arrays from the machine learning model, each array of the plurality of arrays representing a level of the taxonomy tree, each array consisting of values corresponding to nodes at that level of the taxonomy tree and representing likelihoods that the item should be categorized in respective ones of the categories corresponding to the nodes at that level of the taxonomy tree;

traversing the taxonomy tree based on the plurality of arrays to determine a predicted category, the traversal including:

choosing, from an array representing a highest level tier, a category having a highest likelihood, thereby designating a tier prediction;

traversing the tree wherein for a given tier prediction it is determined whether a highest likelihood from children of that tier prediction as collected from arrays representing that level exceeds a threshold and, if so, the category corresponding to that highest likelihood becomes the tier prediction and otherwise the given tier prediction is selected as the predicted category; and returning, from the computing device, the predicted category.

* * * * *